April 10, 1956   R. R. CROOKSTON   2,741,262
APPARATUS FOR CONTROLLING AND RELEASING PRESSURE
Filed Nov. 24, 1950
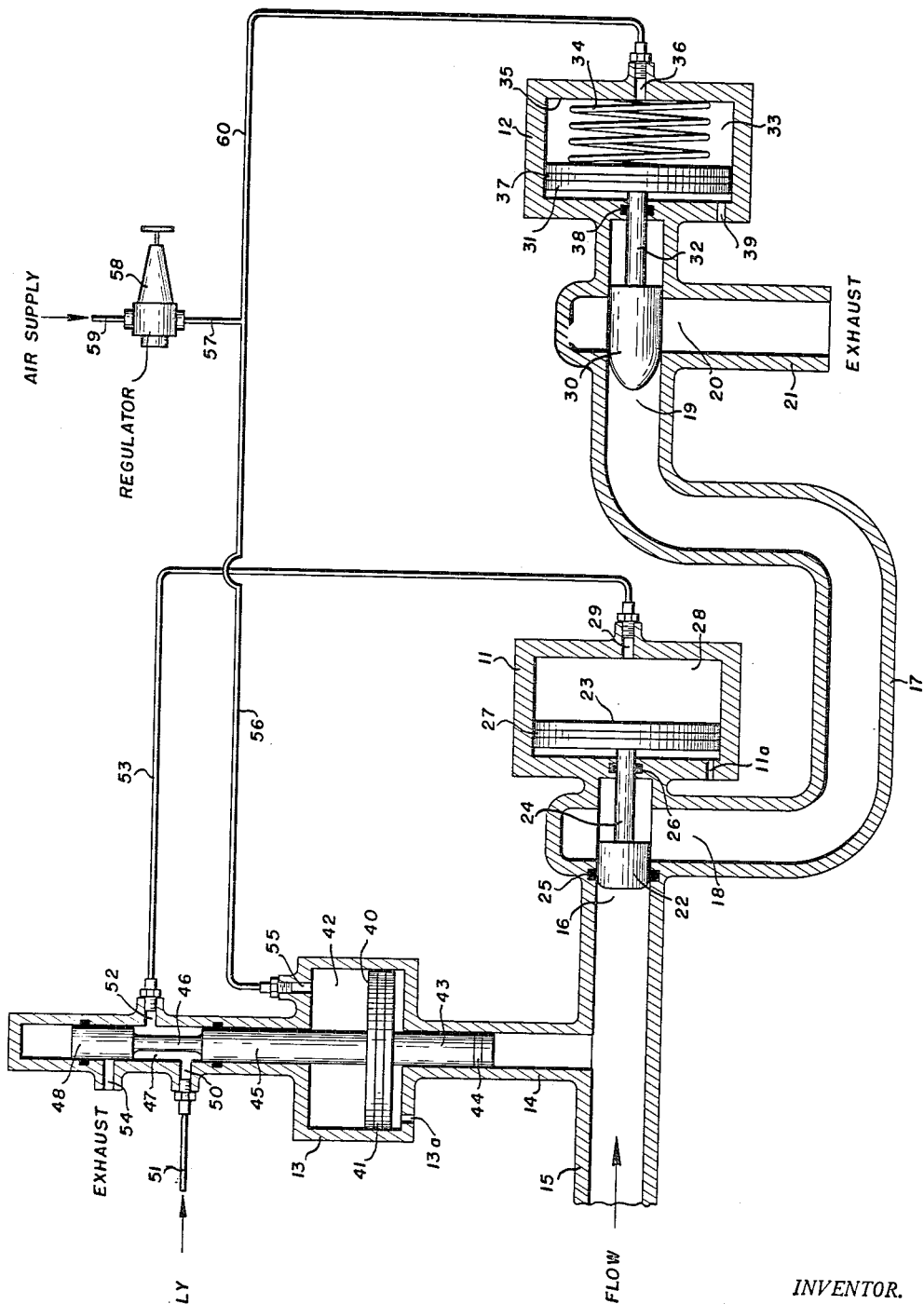
INVENTOR.
Robert R. Crookston,
BY
AGENT.

United States Patent Office 2,741,262
Patented Apr. 10, 1956

2,741,262

APPARATUS FOR CONTROLLING AND RELEASING PRESSURE

Robert R. Crookston, Houston, Tex., assignor, by mesne assignments, to Esso Research & Engineering Company, Elizabeth, N. J., a corporation of Delaware Application November 24, 1950, Serial No. 197,423

3 Claims. (Cl. 137—492)

The present invention is directed to apparatus for releasing pressure, such as the pressure of drilling fluid being pumped by a mud or slush pump. More particularly, the invention is directed to a combination of elements for releasing and controlling pressures and particularly pressures engendered in pumping drilling fluids and the like.

The principal parts of the apparatus of the present invention include a valve housing which defines an inlet and an outlet thereto. Arranged in the valve housing are first and second interconnected pistons, the first piston being arranged in the housing in a position to open and close the inlet and the second piston being arranged in a chamber defined by the housing and adapted to cause movement of the first piston to close the inlet when the second piston is actuated. Connected to the inlet is a conduit to allow flow of fluid thereto. Means are provided for supplying an operational fluid to and for exhausting an operational fluid from said second piston. The operational fluid supplied to the second piston is maintained at a constant pressure.

The invention also includes apparatus for releasing and controlling pressures, such as controlling drilling fluid and the like, whereby the chamber described hereinabove is provided with a compression means bearing frictionally against the second piston and an inner wall of said chamber. By providing compression means and eliminating means for exhausting the fluid, it is possible to throttle the flow of fluid as well as release the pressure in a manner which will be described further.

The present invention also includes a combination of elements including apparatus for releasing pressure and controlling the flow of drilling fluid including first and second valve members, the outlet of one being connected to the inlet of the other, each of which is provided with pairs of interconnected pistons. The first of each of the interconnected pistons serves to open and close the inlets while the second of each of the interconnected pistons serves to actuate the first of each of the pairs of pistons to cause movement of the first of each of the pistons to close the inlet. A conduit connected to the inlet of the first of the valves is provided with a pressure responsive means responding to the pressure of fluid to the inlet of the first of the valves. The pressure responsive means and the second of the valves are fluidly connected to a constant source of air pressure. Embodied in the pressure responsive means and actuated thereby is a valve arrangement connected to a source of constant pressure whereby operational fluid is delivered to the second piston of the first of the valves at a point ahead thereof to cause actuation of same and thus serve to close the inlet to the first valve. The pressure responsive means also includes an exhaust port which allows release of fluid from the second piston of the first valve when the same is opened by excessive pressure in the conduit connected to the inlet thereto. The second of the valves has arranged therein bearing frictionally against the second piston thereof a compression means which serves as an adjustment for the throttling of the valve in exerting a throttling action.

The invention will be described in further detail by reference to the drawing in which the single figure is a sectional view of a preferred embodiment thereof.

Referring now to the drawing, numeral 11 designates a release valve and numeral 12 designates a throttling valve. A pilot valve 13 is connected by a conduit 14 with a mud conduit 15 which connects to an inlet 16 of valve 11. A conduit 17 is connected to the outlet 18 of valve 11 and conduit 17 is connected to inlet 19 of valve 12. Valve 12 is provided with an outlet 20 defined by conduit 21 which suitably may discharge into a mud or slush pit. Valve 11 is provided with a first piston 22 which is connected to a second piston 23 by an elongated member 24. Pistons 22 and 23 and member 24 are provided, respectively, with sealing rings 25, 27, and 26. These sealing rings may conveniently be O-rings. The valve 11 defines a chamber 28 provided with a port 29 which is connected to valve 13 in a manner which will be described further. Chamber 28 may be exhausted or bled to the atmosphere by passageway 11a.

Valve 12 is provided with a first piston 30 connected to a second piston 31 by an elongated member 32. Valve 12 is a throttling valve and defines a chamber 33 in which is arranged a compression means, such as a helical coil spring 34, which bears frictionally against piston 31 and an inner wall 35 of valve 12. Similarly to valve 11 and chamber 28, valve 12 and chamber 33 are provided with a port 36, the purpose of which will be described in more detail hereinafter.

Piston 31 of valve 12 is provided with a sealing ring 37 which conveniently may be an O-ring and the elongated member 32 which connects the two pistons is similarly sealed with a sealing ring 38 which also may be an O-ring. The chamber 33 is provided with a passageway 39 which releases the back side of piston 31 to the atmosphere.

Arranged in valve 13 is a piston 40 provided with a sealing ring such as an O-ring 41, the piston being arranged in a changer 42 defined by valve 13. The piston 40 is constructed with an extension 43 and is slidably arranged in conduit 14 and serves as a piston member against which fluid pressure may work. The extension 43 is provided with a sealing ring 44, such as an O-ring. An upper extension member 45 of piston 40 has a reduced portion 46 which defines a passageway 47 which will be described further. The upper end 48 of the extension 45 then increases in size to make a slidable fit with the valve 13. In effect, the valve 13 defines a second valve with an inlet 50 defined thereby for admission of fluid pressure, such as air, through line 51. This supply of air is at a constant prearranged pressure. The passageway 47 defined by the reduced portion 46 allows the air pressure to pass from the inlet 50 to an outlet 52 which is connected to the conduit 53 which connects to port 29 of valve 11. The second valve of valve 13 is provided with an exhaust port 54 for release of air pressure to the atmosphere. Valve 13 is also provided with a passageway or bleeder 13a which releases the back side of piston 40 to the atmosphere.

The valve 13 defines an inlet and exhaust port 55 which is connected by conduit 56 and branch conduit 57 to an air regulator 58 which, in turn, is connected by conduit 59 to a source of air supply which may be the same source of air supply to which conduit 51 is connected.

Port 36 of valve 12 is connected by conduit 60 to conduit 57 and by regulator 58 and conduit 59 to a source of air supply.

The apparatus of the present invention operates in the following manner:

Assuming that a mud or slush pump discharge is connected to conduit 15 and it is desired to protect the mud pump against a positive pressure of about 1000 lbs./sq. in. gauge, the air supply connected to conduit 51 would be adjusted at line pressure or something greater than the regulating air pressure and air would be delivered through conduit 51, passageway 47, port 52 and conduit 53 to port 29 to be exerted against the piston 23 which would hold piston 22 in inlet 16, closing the valve against flow of mud therethorugh. If the mud pressure should exceed 975 lbs., the extension 43 of piston 40 which constitutes a piston would be moved up closing off the air supply introduced by port 59 and allowing the air in chamber 28 to be exhausted through port 29, conduit 53, port 52 and by passageway 47 to exhaust 54 whereby mud pressure at inlet 16 causes piston 22 to open rapidly. Meanwhile, the mud pressure would be discharged by outlet 18 into conduit 17 against the piston 30 which is closing inlet 19 to valve 12. Since it is undesirable to release completely the mud pressure, the valve 12 serves to throttle the pressure and is designed to maintain a pressure of about 975 lbs./sq. in. gauge plus whatever pressure might be added by spring 34 (25–50 or 75 lbs./sq. in.). To this end the air supply 59 would be regulated by regulator 58 to deliver air into conduits 56 and 60. The tension member 34 is designed to exert about 25 or 50 lbs. against the piston 31 and the air pressure of 950 lbs. plus the force exerted by the compression means will cause the piston 31 connected by member 32 to piston 30 to be moved normally to the left. When the effect of the compression member and the regulated supply of air is overcome by the mud pressure in conduits 17 and 19 the piston member 30 will open and move to the right and release some of the pressure but still maintain the pressure at about 975 lbs. which will suitably protect the mud pump, not shown, connected to conduit 15 but still maintaining a working pressure. It is desirable to so proportion piston 40 and extension 43 so that the ratio of the area 40 to that of area 43 times the regulated air pressure in lines 56 and 57 will equal the pressure at which piston 22 will open completely. Also the ratio of the area of piston 31 to piston 30 equals the ratio of area 40 to area 43. The regulated air pressure times the ratio of area 31 to area 30 plus the compression of spring 34 divided by area 30 equals the mud pressure.

It will be apparent that the apparatus of the present invention allows a working pressure to be maintained instead of unloading the pressure all together as is common with the conventional mud release valve. Many ordinary drilling operations, such as "spudding," power pump initial starting, and power pump compounding, require that adequate working pressures be retained in spite of the requirement of protecting the equipment against excess pressures. The apparatus of the present invention protects the equipment to which it is connected by releasing the pressure and by throttling the pressure but yet maintaining a working pressure for the pumps.

It will be seen that the valve 11 is either in an open or in a shut position. In an open position all the pressure is released therethrough while in a shut position the pressure is maintained. On the other hand, the valve 12 throttles the pressure and controls same by virtue of a special flow shape allowing the release valve 11 to be protected against the abrasive action of the drilling mud since it is either completely open or completely shut.

It will be apparent that a unique feature of the present invention is the arrangement of the several elements thereof, in combination, such that the pressure drop across the release valve 11 is very small. Yet with the arrangement of elements, the pumping equipment is protected and the working pressure thereof is maintained.

The apparatus of the present invention has a long life as indicated by an assembly such as been described with respect to the drawing embodying a release valve and a throttling valve in combination with the pilot valve or pressure responsive means having been positioned or released some 2500 times at a working pressure of 1500 lbs./sq. in. gauge with little effect of erosive action on the piston 22 by virtue of the small pressure drop thereacross.

In the device of the present invention it is possible to employ the valve 11 or the valve 12 alone or in combination. For example, if it is desired to eliminate the valve 12 the conduit 17 could be connected to the mud pit. Conduit 60 would be blocked off and it would be possible to operate the valve 11 simply as a release valve in combination with pilot valve 13. In short, a constant source of air pressure would be supplied to chamber 28 which would hold the piston 22 in inlet 16 until the pressure in conduit 56 was overcome. Thereafter pistons 40 and 43 would move upward and exhaust air through port 29, conduit 53, port 52 and thence by passageway 47 to exhaust 54 to permit pistons 22 and 23 to move to the right. The valve 12 used singly would operate in a similar manner.

It is realized, of course, that while some of the elements of the combination of my invention may be used together, that best results are obtained when all of the elements are used.

The nature and objects of the present invention having been completely described and illustrated, what I wish to claim as new and useful and to secure by Letters Patent is:

1. Apparatus for releasing pressure and controlling the flow of drilling fluid which comprises in combination, a valve housing defining an inlet and an outlet thereto, first and second interconnected pistons in said housing, said first piston being arranged in said housing to open and close said inlet and said second piston being arranged in a first chamber defined by said housing and adapted to cause movement of said first piston to close said inlet by actuation of the second piston, a first conduit connected to said inlet for flow of fluid thereto, means for supplying an operational fluid to said first chamber at a constant pressure, means for exhausting said operational fluid from the first chamber, pressure responsive means fluidly connected to said first conduit having valve means arranged therein to connect sequentially said means for supplying an operational fluid to said first chamber and said means for exhausing the operational fluid from the first chamber, a second conduit connected to said outlet, a throttling valve housing defining an inlet and an outlet thereto, said second conduit being connected to the inlet to said throttling valve, third and fourth interconnected pistons in said throttling valve housing, said third piston being arranged in said throttling valve housing to open and close the inlet of said housing and said fourth piston being arranged in a second chamber defined by said throttling valve housing, and means for supplying operational fluid at a constant pressure lower than the pressure of the operational fluid supplied to the first chamber to the second chamber and to the pressure responsive means.

2. Apparatus for releasing pressure and controlling the flow of drilling fluid which comprises, in combination, a valve housing defining an inlet and an outlet thereto, first and second interconnected pistons in said housing, said first piston being arranged in said housing to open and close said inlet and said second piston being arranged in a first chamber defined by said housing and adapted to cause movement of said first piston to close said inlet by actuation of the second piston, a first conduit connected to said inlet for flow of fluid thereto, a pilot valve having a piston member slidably arranged in a chamber defined thereby and fluidly connected to said first conduit whereby it responds to the pressure therein, said pilot valve embodying a valve member connected to the piston member thereof and defining an inlet connected to a supply of operational fluid, an outlet to the atmosphere and a port communicating fluidly with the first chamber at a point ahead of the second piston, a second conduit connected to said outlet, a throttling valve housing defining an inlet and an outlet thereto, said second conduit being connected to the inlet to said throttling valve, third and fourth interconnected pistons in said throttling valve housing, said third piston being arranged in said throttling valve housing to open and close the inlet of said housing and said fourth piston being arranged in a second chamber defined by said throttling valve housing, compression means arranged in said second chamber bearing frictionally against said fourth piston and an inner wall of said second chamber, and a conduit fluidly connected to a regulated supply of operational fluid, to the chamber of said pilot valve at a point behind its piston member, and to the second chamber at a point ahead of said fourth piston.

3. Apparatus in accordance with claim 2 in which the compression means is a helical coil spring.

References Cited in the file of this patent

UNITED STATES PATENTS

| Number | Name | Date |
|---|---|---|
| 1,032,220 | Kilborn | July 9, 1912 |
| 1,584,407 | Thomas | May 11, 1926 |
| 1,664,493 | Smith | Apr. 3, 1928 |
| 1,715,665 | Mason | June 4, 1929 |
| 1,726,721 | Schullstrom | Sept. 3, 1929 |
| 1,848,531 | Lamb | Mar. 8, 1932 |
| 1,925,301 | Campbell | Sept. 5, 1933 |
| 2,061,852 | Schweitzer | Nov. 24, 1936 |
| 2,214,308 | Polak | Sept. 10, 1940 |
| 2,243,711 | Lamb | May 27, 1941 |
| 2,350,202 | Thomas | May 30, 1944 |
| 2,360,733 | Smith | Oct. 17, 1944 |
| 2,574,414 | Ragland | Nov. 6, 1951 |
| 2,599,534 | Annin | June 20, 1952 |
| 2,632,631 | Griffin et al. | Mar. 24, 1953 |

FOREIGN PATENTS

| Number | Country | Date |
|---|---|---|
| 8,372 | Great Britain | 1914 |
| 229,147 | Great Britain | Feb. 19, 1925 |
| 500,548 | Germany | June 23, 1930 |